(12) United States Patent
Batson et al.

(10) Patent No.: US 8,469,335 B2
(45) Date of Patent: Jun. 25, 2013

(54) PRESSURE ENERGIZED SPRING SEAL

(75) Inventors: Perry Batson, Houston, TX (US); Nelson P. Nguyen, Houston, TX (US); Namhyo Kim, Houston, TX (US); Steve Rosenblatt, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 293 days.

(21) Appl. No.: 12/814,781

(22) Filed: Jun. 14, 2010

(65) Prior Publication Data

US 2011/0303862 A1    Dec. 15, 2011

(51) Int. Cl.
*F16K 25/00* (2006.01)

(52) U.S. Cl.
USPC ............ 251/180; 251/175; 251/176; 251/314

(58) Field of Classification Search
USPC ................. 251/175, 176, 180, 192, 314, 316, 251/317
See application file for complete search history.

(56) References Cited

U.S. PATENT DOCUMENTS

| | | | |
|---|---|---|---|
| 3,304,050 A * | 2/1967 | Fawkes | 251/306 |
| 3,392,743 A | 7/1968 | Pennington | |
| 3,394,915 A * | 7/1968 | Gachot | 251/174 |
| 4,147,327 A | 4/1979 | Moran | |
| 4,231,546 A * | 11/1980 | Eggleston et al. | 251/173 |
| 4,277,047 A * | 7/1981 | Zinnai | 251/362 |
| 4,286,614 A * | 9/1981 | Kacal et al. | 137/72 |
| 4,293,116 A * | 10/1981 | Hinrichs | 251/173 |
| 4,395,050 A * | 7/1983 | Wirz | 251/332 |
| 4,397,446 A * | 8/1983 | Jelinek | 251/309 |
| 4,410,163 A * | 10/1983 | Scobie et al. | 251/306 |
| 4,509,546 A | 4/1985 | Brookes | |
| 4,744,572 A * | 5/1988 | Sahba et al. | 277/641 |
| 5,106,176 A | 4/1992 | Proumellec et al. | |
| 5,799,954 A * | 9/1998 | Layer | 277/614 |
| 6,076,836 A * | 6/2000 | Bretschneider et al. | 277/642 |
| 6,260,822 B1* | 7/2001 | Puranik | 251/328 |
| 6,446,978 B1* | 9/2002 | Halling et al. | 277/626 |
| 6,896,049 B2 | 5/2005 | Moyes | |
| 6,966,537 B2* | 11/2005 | Sundararajan | 251/172 |
| 7,316,271 B2 | 1/2008 | Moyes | |
| 7,789,397 B2* | 9/2010 | Halling | 277/604 |
| 2011/0284784 A1* | 11/2011 | Abel et al. | 251/180 |

* cited by examiner

*Primary Examiner* — John K Fristoe, Jr.
*Assistant Examiner* — Umashankar Venkatesan
(74) *Attorney, Agent, or Firm* — Steve Rosenblatt

(57) ABSTRACT

A metallic seal for a 90° valve features a generally rectangular shape in section that defines a chamber open to internal pressure that can enlarge the chamber to enhance the sealing effect. Sealing occurs at discrete locations at portions of the seal that are preferably rounded in shape. Overlapping ends that define the entrance to the chamber also are positioned to minimize excessive deflection and resulting plastic deformation that could close off the entrance to the chamber.

17 Claims, 1 Drawing Sheet

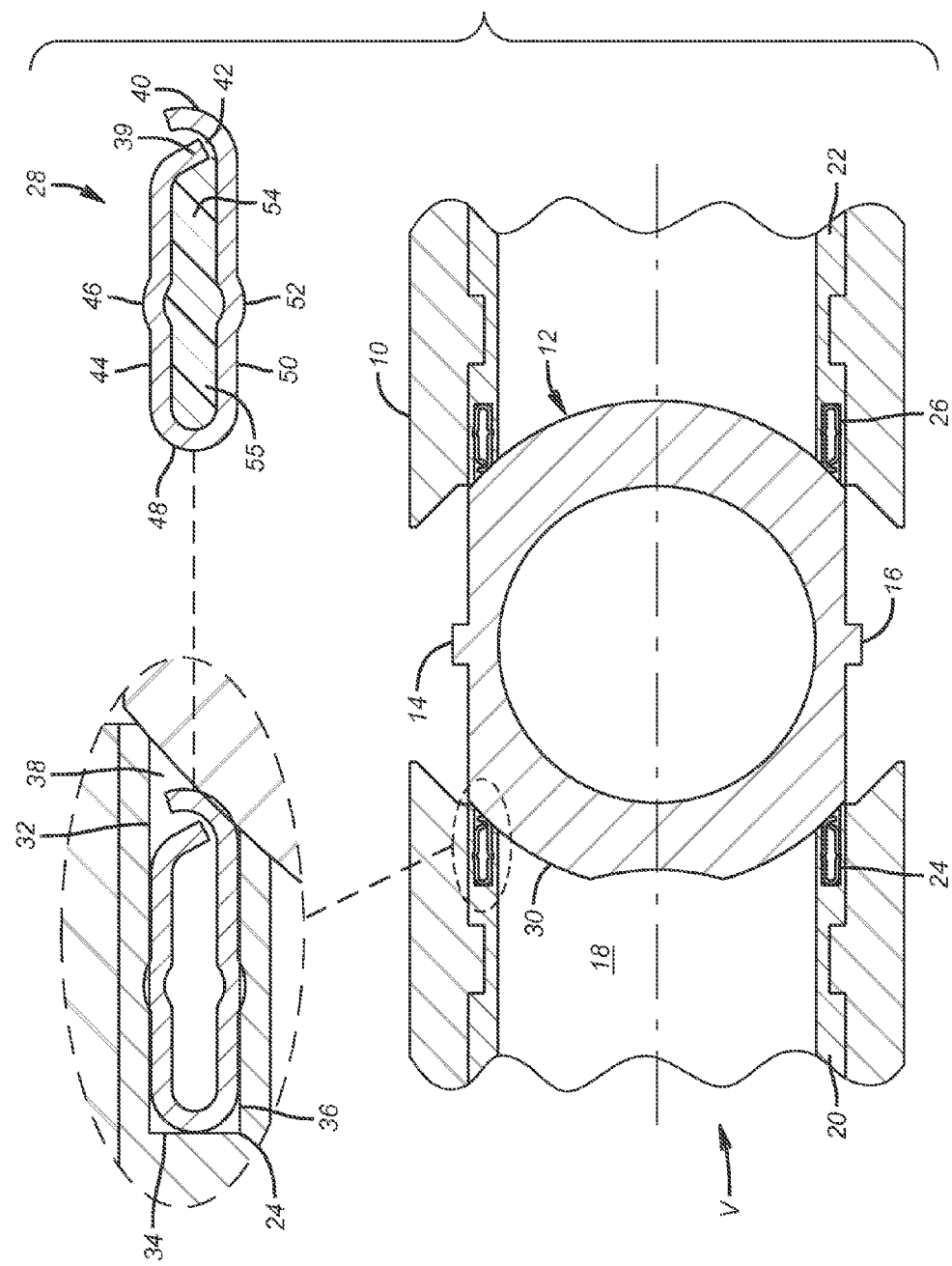

PRESSURE ENERGIZED SPRING SEAL

FIELD OF THE INVENTION

The field of the invention is metal seal design for a ball valve and more particularly where the seal function is enhanced by its shape and response to applied differential pressure.

BACKGROUND OF THE INVENTION

Ball valves have been used in a variety of industrial processes and in subterranean use such as a wellbore. These designs feature a plug or ball that turns 90 degrees between an open and a closed position usually between two sleeves that have end seals that abut the ball or the plug as the ball is turned by a manual or automatic actuator that is rotated in line with two opposed pivot pins that extend from the ball or plug and are otherwise retained by the valve housing. The actuator can be as simple as a handle or it can be a more complex assembly of a piston engaging a cage around the ball in a location offset from the pivot axis so that piston reciprocation turns the ball or the plug the required 90 degrees between the fully open and closed positions.

Usually the ball seals were resilient materials that had temperature service limits of around 100° C. Various specialty materials such as Teflon® were used to increase the temperature service limits. There were concerns with the safety of such valves to hold pressure in the event of a fire that destroyed the resilient seals. Some ball valve designs were advertised as safe in fires because they employed a variety of designs that could move a metal to metal seal against the ball as the resilient seal failed from excess temperature. Some designs along these lines are U.S. Pat. Nos. 4,509,546; 3,392, 743; and 5,106,176. Metallic deformable seals have been used to seal annular spaces such as in packers used for zone isolation in a wellbore as illustrated in U.S. Pat. No. 6,896, 049 or 7,316,271.

Some ball valve designs used an L-shaped metal seal and took advantage of stored potential energy in the shape to keep an end of it against the ball surface. In variation of that design differential pressure across the seal was used to physically advance a leg of the seal assembly by securing the leg to a piston that was biased by the differential pressure across the seal. These design variations can be seen in U.S. Pat. No. 4,147,327 entitled Metallic Seals for Ball Valves.

The present invention uses a metallic seal with multiple discrete seal locations with a shape in section that defines a single entry chamber so that pressure in the chamber enhances the seal. Rounded contact locations on the seal with the valve housing and the ball are preferred. The chamber inlet configuration acts to minimize undue deflection that may cause the chamber opening to close as well as addressing the provision of a support to reduce the chance of undesired plastic deformation of the metal seal. These and other aspects of the present invention will be more readily appreciated by those skilled in the art by a review of the description of the preferred embodiment and the associated drawings while understanding that the full scope of the invention is to be determined by the appended claims.

SUMMARY OF THE INVENTION

A metallic seal for a 90° valve features a generally rectangular shape in section that defines a chamber open to internal pressure that can enlarge the chamber to enhance the sealing effect. Sealing occurs at discrete locations at portions of the seal that are preferably rounded in shape. Overlapping ends that define the entrance to the chamber also are positioned to minimize excessive deflection and resulting plastic deformation that could close off the entrance to the chamber.

BRIEF DESCRIPTION OF THE DRAWING

The FIGURE shows an overall ball valve assembly with detail of one of the seal locations and a further detail of the seal itself.

DETAILED DESCRIPTION OF THE PREFERRED EMBODIMENT

Valve V is shown in section through the housing 10 with several parts removed related to the support and operation of the ball 12 about tabs 14 and 16 which define its pivot axis. The ball 12 is shown in the closed position blocking the passage 18 through the housing 10. Sleeves 20 and 22 are retained to the housing 10 on opposed sides of ball 12 such that seal receptacles 24 and 26 are facing the ball 12 at their respective open ends.

The seal 28 is metallic and is preferably made of Nickel Cobalt Alloy (MP35N), 718 Nickel Alloy or Elgiloy. A coating of Xylan® 1404 or silver plating can optionally be applied. The ball surface 30 that is in contact with seal 28 is preferably carbide coated.

Receptacle 24 has a generally rectangular shape defined by walls 32, 34 and 36 with an open end 38 facing the ball 12. Receptacle 26 is the minor image of receptacle 24.

Seal 28 is illustrated in section and will be described as a series of adjoining segments. End 39 is overlapped by curved end 40 to define an opening 42 between them. Segment 44 has an arcuate or rounded hump 46 about at the midpoint between end 39 and hairpin segment 48. Segment 50 is generally parallel to segment 44 and is about the same length to the transition that marks the end 40. Rounded or arcuate hump 52 is preferably in alignment with hump 46 but they can be offset.

Pressure entering opening 38 will pass through opening 42 of the seal 28 and force the segments 44 and 50 apart so that sealing contact occurs at humps 46 and 52. The seal 28 is also pushed back so that segment 48 abuts wall 34 for another sealing location. Pressure entering the chamber 54 defined within the seal 28 will also force the end 40 against the surface 30 of the ball 12. The presence of end 39 adjacent and inside of end 40 also provides some support to end 40 to keep it from flexing too much to the point of plastic deformation. Accordingly chamber 54 serves to energize the metal seal assembly and in the illustrated embodiment offers four discrete seal locations that are spaced apart.

Those skilled in the art will appreciate that variations on the illustrated design are also contemplated. For example, the segments 44 and 50 do not need to be parallel and can be askew. Those same segments can have a single hump as illustrated or multiple humps. The humps can come to sharp points or can be rounded and even flat. The seal can be made of a shape memory alloy that at the anticipated service temperatures that exceed the critical temperature an additional sealing force is deployed as the seal grows in length, putting an additional sealing force on segments 40 and 48 or width, putting additional force on the segments 44 and 50 to enhance the sealing force on humps 46 and 52. As another option a swelling material such as foam shown schematically as 55 can be inserted into the chamber 54 before assembly and deployment of the valve V either to enhance the sealing force by providing an internal potential energy force in an outward direction or at minimum to keep debris out of chamber 54 so that the seal can enjoy a long service life. The swelling material 55 can take part or the entire chamber 54. The filler material is preferably PEEK or PTFE.

Note that in receptacle 24 the seal 28 seals unidirectionally against differential pressure from below or downhole and in receptacle 26 seal 28 seals unidirectionally against differential pressure from above or uphole. The seals 28 are preferably inserted into the receptacles 24 and 26 in an interference fit so that the seal structure acts like a spring and uses the potential energy to push the projections 46 and 52 against walls 32 and 36.

The above description is illustrative of the preferred embodiment and many modifications may be made by those skilled in the art without departing from the invention whose scope is to be determined from the literal and equivalent scope of the claims below.

We claim:

1. A valve, comprising:
   a housing having a passage extending between ends;
   a rotatably mounted valve member operable from outside said housing for opening and closing said passage;
   opposed unidirectional seals between said housing and said valve member wherein at least one of said seals is metallic and formed to define a chamber by an inner surface thereof and having a outer surface for sealing between said housing and said valve member;
   at least one of said seals further comprises first and second segments having terminal ends connected by a hairpin segment, said terminal ends being gapped and overlapping to form an entrance for pressure within said housing into said chamber;
   said chamber at least in part contains a swelling material that responds to fluid entering said chamber.

2. The valve of claim 1, wherein:
   said swelling material substantially fills said chamber.

3. The valve of claim 1, wherein:
   said swelling material comprises a foam.

4. The valve of claim 1, wherein:
   said seal is made of a shape memory alloy that changes dimension or volume to enhance the sealing force against said valve member or said receptacle.

5. The valve of claim 1, wherein:
   said at least one seal comprises opposed seals on said valve member in opposed orientations.

6. The valve of claim 1, wherein:
   said at least one seal comprises opposed seals on said valve member in opposed orientations with said entrances to said chambers of said seals facing each other.

7. The valve of claim 1, wherein:
   said at least one seal is disposed in a receptacle in said housing, said receptacle having an opening facing said valve member.

8. The valve of claim 7, wherein:
   said outer surface of said seal contacts a plurality of walls that define said receptacle.

9. The valve of claim 8, wherein:
   said seal is positioned in said receptacle in an interference fit that stores a force in said seal applied against the walls of said receptacle.

10. The valve of claim 8, wherein:
    said outer surface comprises at least one projection to initially contact an opposing wall of said receptacle.

11. The valve of claim 10, wherein:
    said projection is rounded, pointed or flat.

12. The valve of claim 11, wherein:
    said at least one projection comprises a plurality of projections with at least one mounted on a first segment of said seal and a second projection mounted on a second segment of said seal where the segments extend substantially parallel or are skewed with respect to each other and said first and second projections engage opposed walls in said receptacle.

13. The valve of claim 1, wherein:
    an outer of said ends has an outer surface in contact with said valve member and an inner of said ends is disposed to limit movement of said outer end.

14. The valve of claim 13, wherein:
    pressure applied between said gapped ends and into said chamber forces said projections against an opposing wall of said receptacle.

15. The valve of claim 14, wherein:
    pressure applied between said gapped ends and into said chamber forces said hairpin segment against an opposing wall of said receptacle.

16. The valve of claim 15, wherein:
    said seal is positioned in said receptacle in an interference fit that stores a force in said seal applied against the walls of said receptacle.

17. The valve of claim 15, wherein:
    said seal is made of a shape memory alloy that changes dimension or volume to enhance the sealing force against said valve member or said receptacle.

\* \* \* \* \*